(12) United States Patent
Roozbeh et al.

(10) Patent No.: US 9,875,057 B2
(45) Date of Patent: Jan. 23, 2018

(54) METHOD OF LIVE MIGRATION

(71) Applicant: TELEFONAKTIEBOLAGET L M ERICSSON (PUBL), Stockholm (SE)

(72) Inventors: Amir Roozbeh, Kista (SE); Joao Monteiro Soares, Solna (SE); Daniel Turull, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 193 days.

(21) Appl. No.: 14/760,211

(22) PCT Filed: Jun. 16, 2015

(86) PCT No.: PCT/EP2015/063417
§ 371 (c)(1),
(2) Date: Jul. 10, 2015

(87) PCT Pub. No.: WO2016/202364
PCT Pub. Date: Dec. 22, 2016

(65) Prior Publication Data
US 2017/0139637 A1    May 18, 2017

(51) Int. Cl.
*G06F 3/00* (2006.01)
*G06F 3/06* (2006.01)

(52) U.S. Cl.
CPC ............ *G06F 3/0647* (2013.01); *G06F 3/067* (2013.01); *G06F 3/0617* (2013.01);
(Continued)

(58) Field of Classification Search
CPC ...... G06F 3/0617; G06F 3/0646; G06F 3/067; G06F 12/0646; G06F 12/0692; G06F 12/1036; G06F 12/109
(Continued)

(56) References Cited

U.S. PATENT DOCUMENTS 6,108,748 A    8/2000  Ofek et al.
8,527,990 B1    9/2013  Marathe et al.
(Continued)

OTHER PUBLICATIONS

Qazi et al., 'Harnessing Memory Page Distribution for Network-Efficient Live Migration', 2014 IEEE, pp. 264-267, 2014.*
(Continued)

*Primary Examiner* — Reba I Elmore

(57) ABSTRACT

A method of migrating of an application from a source host to a destination host, wherein the application is associated with a plurality of memory pages, the source host comprises a first instance of the application and a source memory region, and each memory page has an associated source memory block in the source memory region, the method comprising: at the destination host, reserving a destination memory region such that each memory page has an associated destination memory block in the destination memory region, a second instance of the application at the destination host; on receipt of an input to the application, processing the input in parallel at the first and second instances at respective source and destination hosts: at the source host, if the processing requires a read or a write call to a memory page, respectively reading from or writing to the associated source memory block; the destination host, if the processing requires a write call to a memory page, writing to the associated destination memory block and if the processing requires a read call to a memory page, sending the read call to the source host requesting that the source host read the memory page from the associated source memory block and provide the memory page to the destination host, and, on receipt of the memory page by the destination host, writing the memory page to the associated destination memory block.

13 Claims, 17 Drawing Sheets

(52) U.S. Cl.
CPC .......... *G06F 3/0605* (2013.01); *G06F 3/0629* (2013.01); *G06F 3/0658* (2013.01); *G06F 3/0683* (2013.01)

(58) Field of Classification Search
USPC ........ 711/165, 168, 173; 709/218, 225, 229; 710/1, 21, 52, 60, 301; 712/225
See application file for complete search history.

(56) References Cited

U.S. PATENT DOCUMENTS

| | | | |
|---|---|---|---|
| 8,671,238 | B2 | 3/2014 | Mashtizadeh |
| 8,689,211 | B2 | 4/2014 | Agbaria |
| 8,949,431 | B2 | 2/2015 | Bercovici |
| 2014/0019974 | A1* | 1/2014 | Siu .................. G06F 9/4856 718/1 |
| 2014/0089393 | A1 | 3/2014 | Druet |
| 2015/0378766 | A1* | 12/2015 | Beveridge .......... G06F 9/45558 718/1 |
| 2015/0378767 | A1* | 12/2015 | Tarasuk-Levin .... G06F 9/45558 718/1 |
| 2015/0378783 | A1* | 12/2015 | Tarasuk-Levin .... G06F 9/45558 718/1 |
| 2016/0255543 | A1* | 9/2016 | Yadhav ............. H04W 36/0016 370/331 |
| 2016/0283421 | A1* | 9/2016 | Wilson ................ G06F 9/45558 |

OTHER PUBLICATIONS

Clemente-Castello et al., 'Adaptive Downtime for Live Migration of Virtual Machines', 2014 IEEE, pp. 457464, 2014.*
Liu et al., iAware: Making Live Migration of Virtual Machines Interference-Aware in the Clour, IEEE Transaction on Computers, vol. 63, No. 12, pp. 3012-3025, Dec. 2014.*
Zheng et al., 'Pacer: A Progress Management System for Live Virtual Machine Migration in Cloud Computing', IEEE Transactions on Network and Service Mangement, vol. 10, No. 4, pp. 369-382, Dec. 2013.*
Clark, C., et al., "Live Migration of Virtual Machines," NSDI '05: 2nd Symposium on Networked Systems Design & Implementation, USENIX Association, pp. 273-286, 2005.
Mashtizadeh, et al., XvMotion: Unified Virtual Machine Migration over Long Distance, 2014 USENIX Annual Technical Conference (ATC), pp. 97-108, Jun. 19, 2014.

* cited by examiner

METHOD OF LIVE MIGRATION

TECHNICAL FIELD

The technical field is live migration.

BACKGROUND

Live migration is the process whereby a running application is moved between different physical machines without disconnecting a client or the application. Applications to which live migration may be applied include virtual machines, containers or other processes or tasks run by an operating system. A virtual machine is an emulation of a computer system, such as an operating system or application environment. A container or lightweight virtualization is an operating system level virtualization environment for running multiple isolated operating systems on a single host. Each container is isolated from each other and has access to a subset of the resources of the operating system.

In live migration, the memory, storage, and network connectivity of the application are transferred from the original host machine to the destination host machine. Live migration allows an administrator to shut down a physical server for maintenance or upgrades without subjecting the system's users to downtime. It also facilitates proactive maintenance since, if an imminent failure is suspected, the potential problem can be resolved before disruption of service occurs. Live migration can also be used for load balancing, in which work is shared among computers in order to optimize the utilization of available CPU resources.

In order to be effective, live migration must cause the minimum of disruption to continued execution. To achieve this aim, two main techniques are used, namely, pre-copying and post-copying.

In pre-copy memory migration, the data is copied from source memory to destination memory while the application is still running on the source. If some memory pages change (become 'dirty') during this process, they will be re-copied. This first stage is referred to as the "warm-up" phase. After the warm up phase, the "stop and copy" phase is performed. This involves the stopping of the application on the source host and the remaining "dirty" pages being copied to the destination host. There is a downtime between the stopping of the application on the source host and its resumption on the destination host.

In post-copying, the application is suspended at the source host and a minimal subset of the execution state of the application is transferred to the destination host. The application is then resumed at the destination host. Concurrently the source host pushes the data in the remaining memory pages to the destination memory, in a process known as pre-paging. If at the destination host, the application tries to access a memory page that has not yet been transferred, it develops a so-called "network fault". If this occurs, then the destination host accesses the memory in the source host. Too many network faults can degrade the performance of applications running in the application.

A number of attempts have been made to improve the performances of both pre-copy and post-copy live migration, and combinations of the two techniques. An early proposal was made by Clark et al ("Live Migration of Virtual Machines", $2^{nd}$ Symposium Networked Systems Design and Implementation 2005). This paper proposes a pre-copy process, but identifies a "writable working set", which is a set of memory pages which are continuously updated and which are therefore not worth copying in the pre-copy phase. These memory pages are only copied in the downtime period.

In US2014/0089393, a tracking tool is used to track modifications made in the data by the application at the source host. When the source host is shutdown, these modifications are passed to the destination host. In U.S. Pat. No. 8,689,211 a recovery point in case of migration failure is defined.

These methods either impose a downtime (e.g., pre-copy) or are subject of possible corruption in case of any failures during the process (e.g., post-copy, and combination of pre-copy and post-copy). U.S. Pat. No. 8,671,238 discloses a method of overcoming these problems by using a shared data-store that stores a file with the instance memory, which is accessible to both source and destination hosts in case the direct communication between hosts fails. It does not however suit all cases, namely in the case of highly time critical processing instance and an approach that does not require a third component (i.e. a shared data-store) is more suitable and efficient.

SUMMARY

Accordingly, in a first aspect of the present invention there is provided a method of migrating an application from a source host to a destination host, wherein the application is associated with a plurality of memory pages, the source host comprises a first instance of the application and a source memory region, and each memory page has an associated source memory block in the source memory region. The method comprises, at the destination host, reserving a destination memory region such that each memory page has an associated destination memory block in the destination memory region and launching a second instance of the application at the destination host. On receipt of an input to the application, the method further comprises processing the input in parallel at the first and second instances. At the source host, if the processing requires a read or a write call to a memory page, the method comprises respectively reading from or writing to the associated source memory block. At the destination host, if the processing requires a write call, the write call is made to the associated destination memory block. If the processing requires a read call, then the read call is sent to the source host requesting that the source host read the memory page from the associated source memory block and provide the memory page to the destination host. On receipt of the memory page by the destination host, memory page is written to the associated destination memory block.

The parallel execution of two instances of the application writing to their own memory allows the overcoming of the problems of other solutions to the implementation of live migration. The continued operation of the source host guarantees a faithful execution of the application in the event of a network failure. This overcomes the problems in post copying techniques, in which a degradation in performance can occur if a network fault occurs and the destination host does not have access to necessary memory in the source host. The parallel execution at the destination host means that there is no problem with the "dirtying" of memory as occurs in pre-copying systems.

Preferably, on receipt of an input whose processing requires a read call to a memory page, the method further comprises determining whether the read call is a first access of a memory page by the second instance. If the read call is not the first access, then the associated destination memory block is read. If the read call is the first access, then the associated source memory block is read.

Preferably, at the source host, on receipt of an input, the processing of which requires a write instruction to a source memory block, it is determined whether a read call has been made for the block by the first instance and whether a read call has been made for the block by the second instance. If a read call has been made by the first instance but not by the second instance, then execution of the write call is postponed. On receipt of a read call from the second instance, the read call from the second instance is executed followed by the execution of the write call.

Preferably, a subset of the plurality of memory pages are copied from the source memory region to the destination memory region prior to the launching of the second instance.

Preferably the subset of memory pages is selected based on the results of a statistical analysis of one or more of the network load, memory usage and data usage.

Optionally a statistical analysis of one or more of the network load, memory usage and data usage is used to determine a start time.

Optionally the opportunistic start time is determined by selecting a period of low activity.

Optionally the first instance is terminated upon completion of transfer of all memory pages to the destination memory region.

Preferably the migration is controlled by a migration layer located on one or both of the source and destination hosts.

According to a second aspect of the invention there is provided a computing platform comprising a central processing unit, a memory and a disk, programmed to, in response to an instruction to commence live migration from a source host, launch an instance of an application, the application being associated with a plurality of memory pages and to reserve a destination memory region such that every memory page associated with the application has an associated memory block in the destination memory region. In response to an input to the application, the computing platform is programmed to process the input and if the processing requires a read call to a memory page read from an associated source memory block at the source host and data acquired from the associated source memory block to the associated destination memory block. If the processing requires a write call to a memory page, the platform is programmed to write to the associated destination memory block.

Preferably the computing platform is further programmed to track read and write calls to the destination memory blocks. On receipt of an input, the processing of which requires a read call to a memory page, the platform is programmed to determine whether the read call is a first access of the memory page during the live migration and then either read the associated destination memory block, if the read call is not the first access or read the associated source memory block, if the read call is the first access.

According to a third aspect of the invention, there is provided a computing platform comprising a central processing unit, a memory and a disk, programmed to host a first instance of an application, host memory pages associated with the application in a source memory region, each memory page being stored in a source memory block, track read calls to source memory blocks, and receive and execute read calls to the source memory region from a second instance of the application. In response to an input to the application, the processing of which requires a write call to a source memory block, the platform is programmed to determine whether a read call has been made for the block by the first instance, determine whether a read call has been made for the block by the second instance and if the block has been read by the first instance but not by the second instance, postpone execution of the write call. On receipt of a read call from the second instance, the read call from the second instance is executed, followed by the write call.

According to a fourth aspect of the invention there is provided a computer program, comprising instructions which, when executed on at least one processor, cause the at least one processor to carry out a method according to the first aspect.

According to a fifth aspect of the invention, there is provided a computer program product comprising a computer program according to the fourth aspect.

According to a sixth aspect of the invention, there is provided a carrier containing the computer program product according to the fifth aspect, wherein the carrier optionally includes an electrical signal, an optical signal, a radio signal, a magnetic tape or disk, an optical disk or a memory stick.

BRIEF DESCRIPTION OF THE DRAWINGS

The above and other aspects of the present invention will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 1:
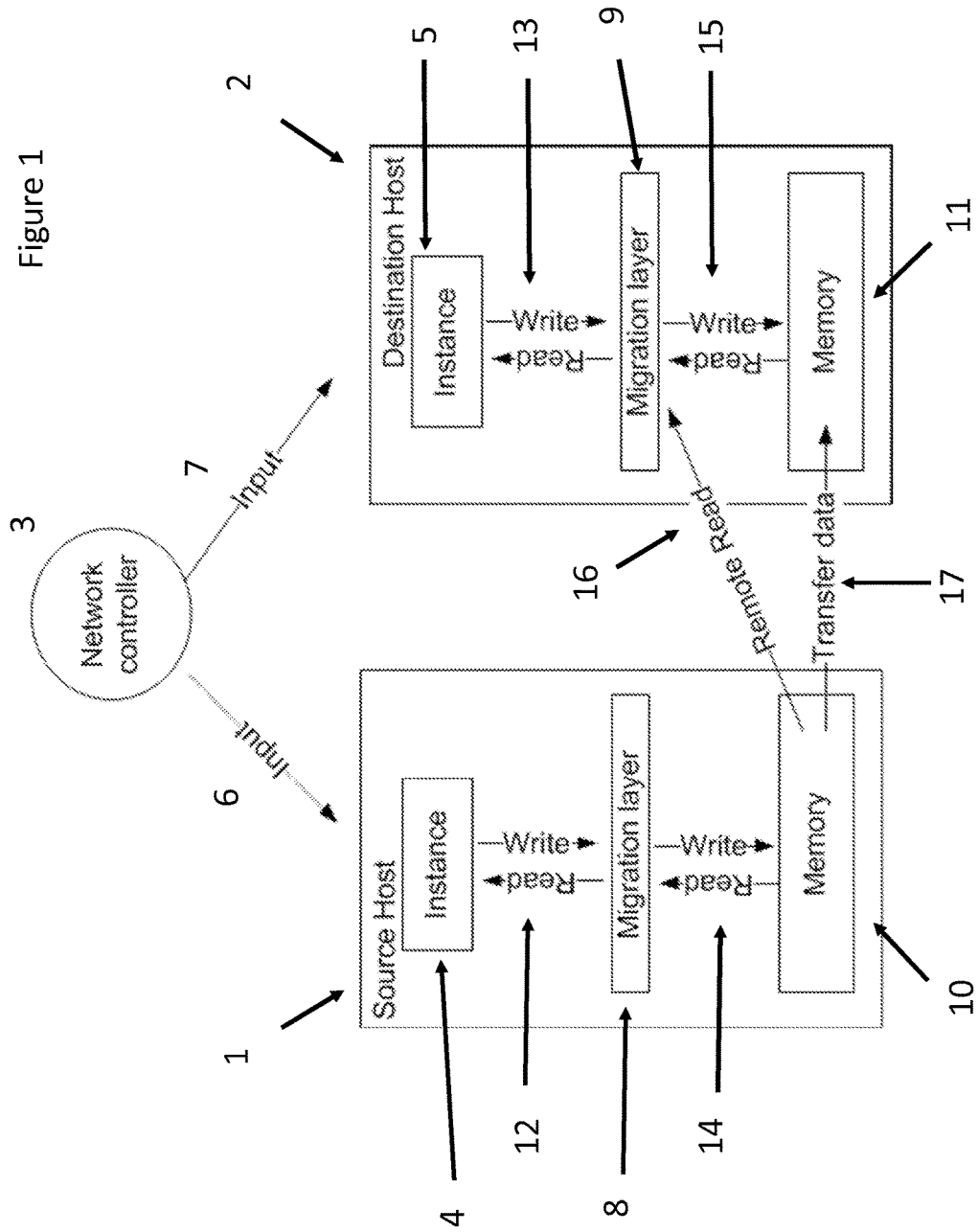
FIG. 1 is a schematic diagram showing an arrangement for live migration according to an embodiment.

FIG. 1 is a schematic diagram showing an arrangement for live migration of an application according to an embodiment of the invention. There are two host systems, namely the source host (1), which is the original system running the application and the destination host (2) to which the application is being transferred. A first instance (4) of the application is located on the source host and a second instance (5) is located on the destination host. Each instance receives exactly the same input and executes exactly the same commands, acting identically in parallel with each other. A network controller (3) controls external access to the application in both its instances, receiving input from external sources and providing output. An input received by the network controller is sent in parallel to each of the hosts to provide inputs 6, 7 to the instances of the application. In the embodiment shown, the network controller is a separate entity from the source and destination hosts. The person skilled in the art will however appreciate that alternative architectures are possible, for example, the network controller may be located on one or the other of the source or destination host. The invention is not limited to any one physical architecture.

Each of the instances has a migration layer and a memory region associated with it. In FIG. 1, the first or host instance (4) is associated with the source migration layer (8) and source memory (10). The second or destination instance (5) is associated with the destination migration layer (9) and destination memory (11). The purpose of the migration layers is to control the live migration process and in particular track the accesses to memory blocks in both the source and the destination memories. For both the source and the destination, when a read or a write call is made to the memory, the call (12, 13) passes first to the migration layer. Once a record of the call has been made, the call is passed (14, 15) to the respective memories (10, 11). In the embodiment of FIG. 1, separate migration layers are provided in each of the source host and the destination host. The person skilled in the art will appreciate however that alternative arrangements for the migration layer are possible, for example in a separate physical entity or a single migration layer located in one or the other of the source host and the destination host. The invention is not limited to any particular location or arrangement of the migration layer.

In addition to read and write calls to the destination memory, the second instance is able to perform read calls (16) from the source memory. As for calls to its own memory, these calls are made through the migration layer. In an embodiment, data may be transferred (17) from the source memory to the destination memory.

The parallel execution of two instances of the application writing to their own memory allows the overcoming of the problems of other solutions to the implementation of live migration. The continued operation of the source host guarantees a faithful execution of the application in the event of a network failure. This overcomes the problems in post copying techniques, in which a degradation in performance can occur if a network fault occurs and the destination host does not have access to necessary memory in the source host. The parallel execution at the destination host means that there is no problem with the "dirtying" of memory as occurs in pre-copying systems.

When an input to the application is received, it is sent to both the source and the destination hosts. At the source host, the processing of the input proceeds as in a normal operation of the application, with data being read from and written to the source memory as required. At the destination host, when the second instance is launched, a memory region is reserved for the application data, but none of that data is available on the destination host. The process of transferring memory occurs as operations are executed by second instance. An input is received and if stored data is required, it is read from the source memory. After processing the resultant data is written to the appropriate memory block in the destination memory. If the processing requires only a write call, then the data is written to the appropriate memory block in the destination memory. The exact write calls are being made in parallel with the same data at the source host. This means that with each operation, identical data is being written to the destination host memory. The data is copied after processing and hence there is no issue of the "dirtying" of memory. The external client of the application will continue to receive the output of the application from the first instance. This means that, if there is a network problem and the destination host is unable to read from memory, there will not be a degradation of performance as in post-copying techniques. The inability to access the source memory will merely mean a postponement of the data transfer for that input.

Each memory access is tracked by the migration layer. Once all the data has been successfully transferred to the destination host memory, the first instance may be shut down and the live migration is then complete.

Figure 2:
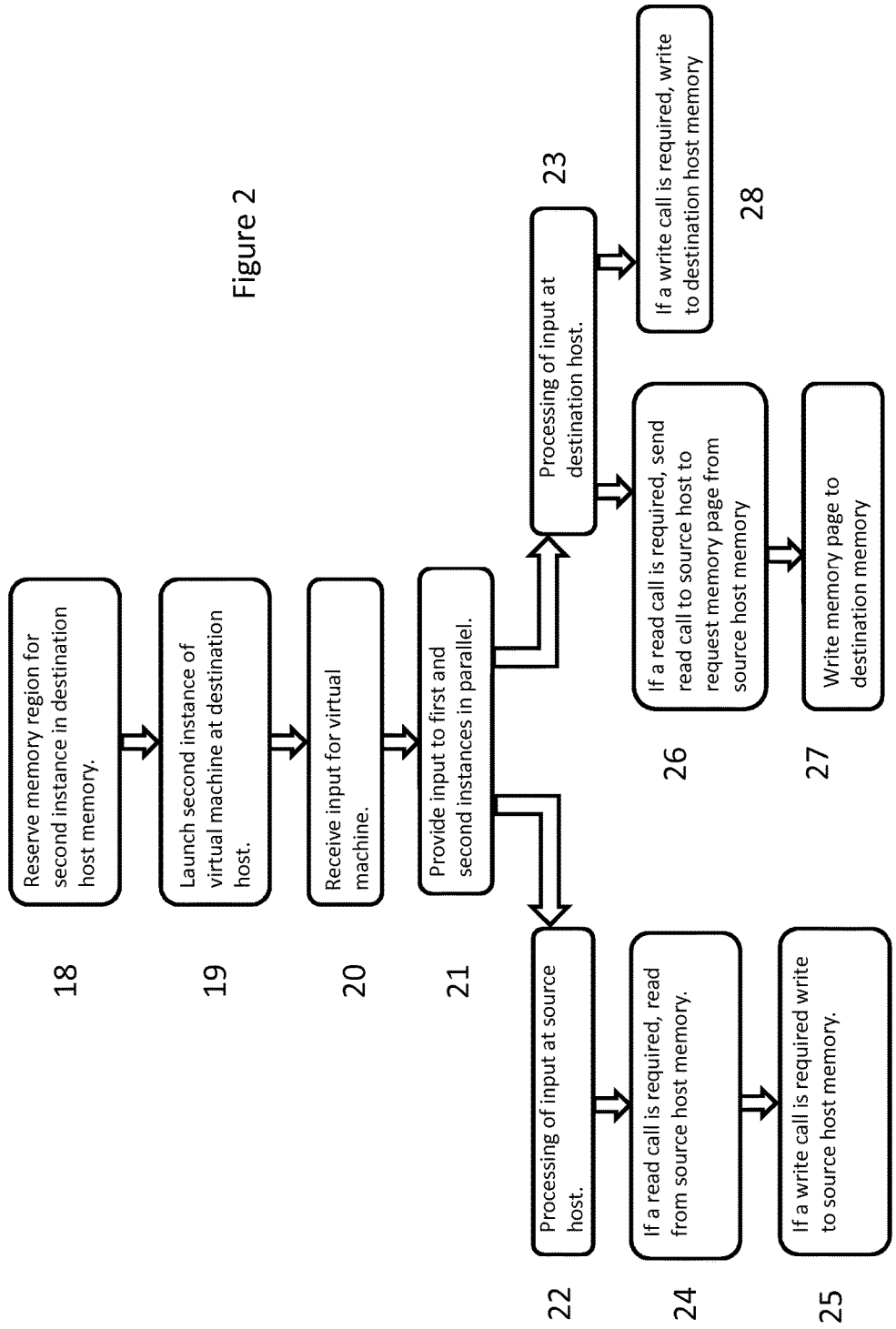
FIG. 2 is a flowchart showing the steps of live migration according to an embodiment.

FIG. 2 is a flow chart illustrating the above process. The process starts with the reservation (18) of a memory region in the destination host for storing the memory pages associated with the application. The next step is the launching (19) of a second instance of the application. On receipt of an input (20) to the application, the input is provided in parallel (21) to both the first and the second instances, which then process (22, 23) the input. If a write or read call is required, then the first instance reads from (24) or writes to (25) the source host memory. At the destination host, if a read call is required then a remote read call to the source host memory is made (26). When any processing is complete, the resulting data is written to the appropriate memory block is made (27). If a write call is required, then the data is written (28) to the appropriate memory block in the destination memory. The migration is complete when all of memory pages are written to the destination memory region.

Figure 3:
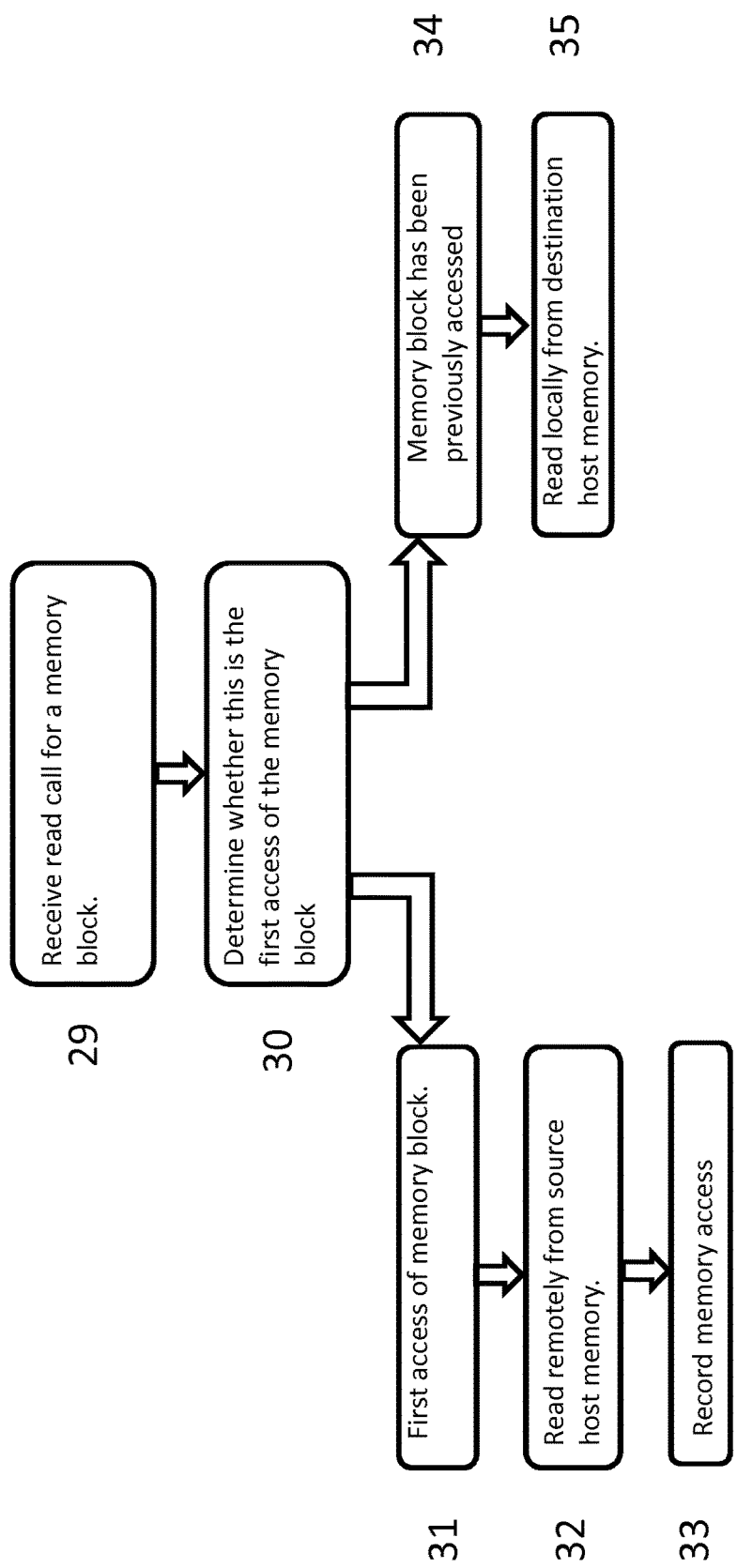
FIG. 3 is a flowchart showing the steps of determining whether a memory block is read locally or remotely at the destination host.

Although it is possible for the destination host to read data from the source memory throughout the migration process, it is an inefficient use of network resources. In an embodiment this problem is overcome by reading locally from the destination memory when possible. FIG. 3 is a flow chart showing the steps of this embodiment. When a read call (29) to a memory block is required by the second instance, the migration layer determines whether the memory block has been previously accessed (30). If the call is the first access (31) of the memory then the read call is made remotely to the source host memory (32). The memory access is then recorded (33). If the memory block has been previously accessed (34), then the memory block will be read locally on the destination host memory (35). As previously, if the call is the first access, then the access to the memory will be recorded so that the migration layer can both determine that the memory block is now locally accessible and keep a record of the overall state of the memory transfer.

The memory transfer occurs as a result of successive inputs to the application, each of which results in the writing of further data to the destination host memory. FIGS. 4 to 10 are schematic diagrams showing the process of filling the memory blocks in the destination memory. In each of these figures, only four memory blocks are shown for simplicity.

Figure 4:
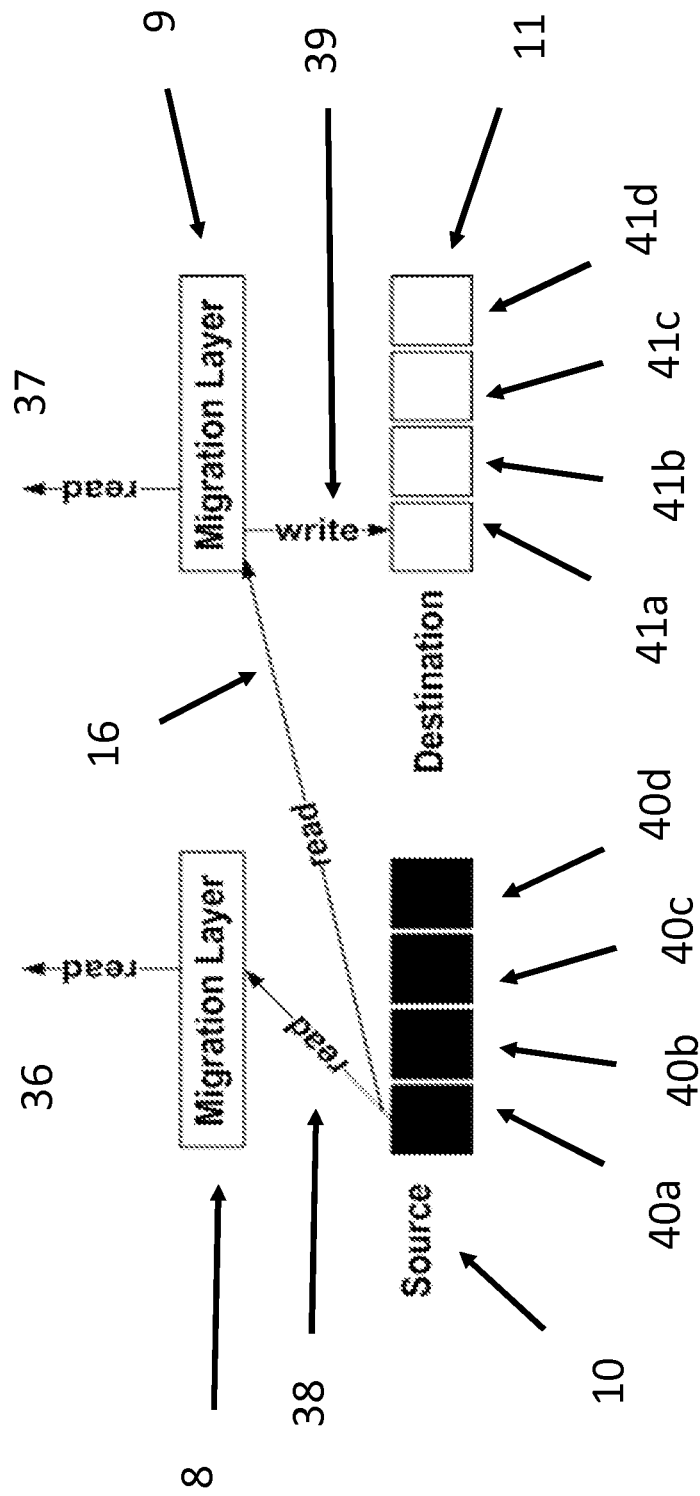
FIG. 4 is a schematic diagram of a step in the transfer of memory pages according to an embodiment.
Figure 5:
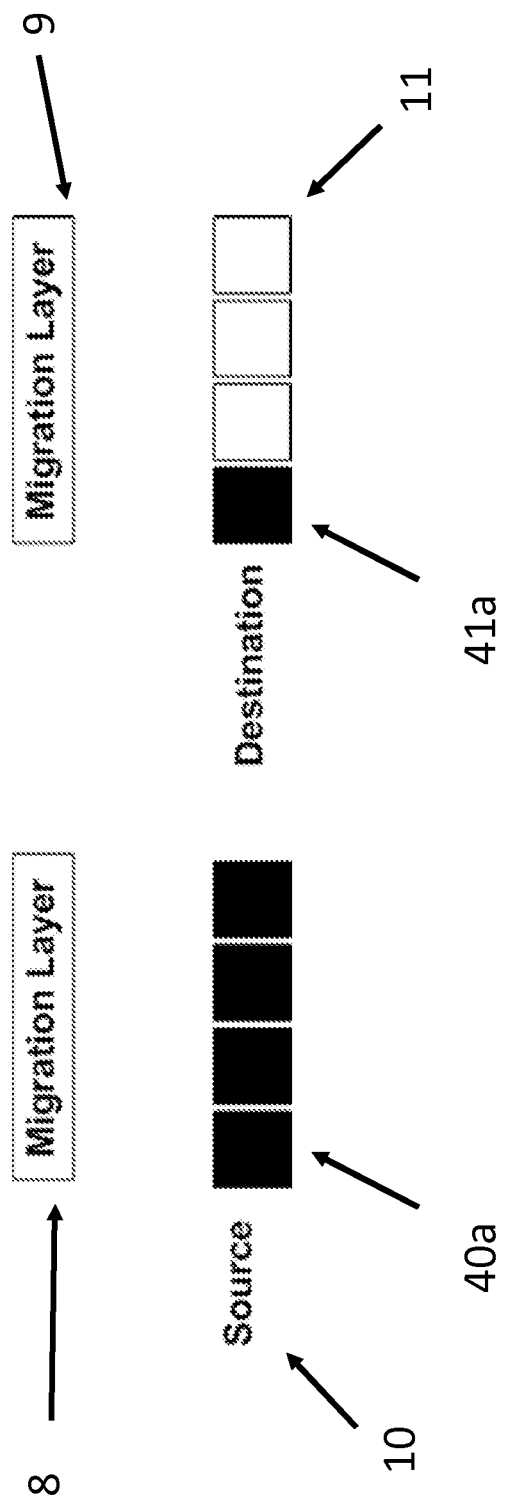
FIG. 5 is a schematic diagram of another step in the transfer of memory pages according to an embodiment.

FIG. 4 shows the source host migration layer (8), the destination host migration layer (9), the source memory (10) and the destination memory (11). The source memory comprises a plurality of memory blocks (40a, 40b, 40c, 40d) and the destination memory comprises a corresponding set of memory blocks (41a, 41b, 41c, 41d). The live migration is complete when each of the memory blocks in the destination memory contains exactly the same data as the corresponding memory block at the source. FIG. 4 shows the state of the memory at the start of the migration process, with the destination memory blocks without data. Throughout FIGS. 4 to 10, blocks with a black fill will denote those containing application data and blocks with a white fill will denote blocks with no data as yet. The process begins with read calls (36, 37) made to the respective migration layers (8, 9). At the source host, the migration layer makes a local read call (38) to the required memory block (40a). At the destination host the migration layer makes a remote read call (16) to the same memory block (40a). The process is completed with a write call to the corresponding memory block (41a) in the destination host memory. FIG. 5 illustrates the outcome of the operation shown in FIG. 4. The first of the memory blocks (41a) now contains the same data as its corresponding memory block (40a) in the source memory (10). This represents the first step of the live migration.

Figure 6:
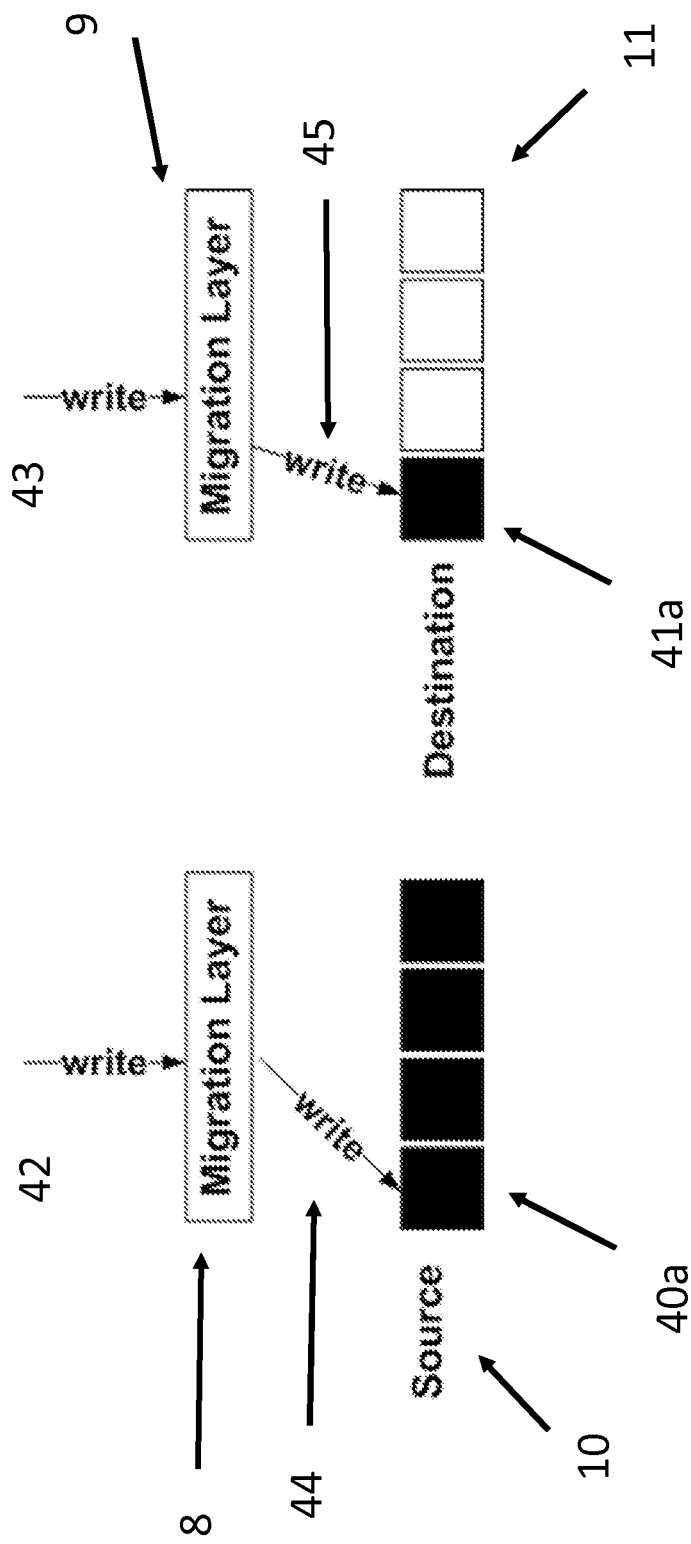
FIG. 6 is a schematic diagram of another step in the transfer of memory pages according to an embodiment.

Not every input to the application will result in a transfer of data however. FIG. 6 is a schematic diagram showing an input which results in a change to already transferred data. Here write calls (42, 43) are made respectively to the migration layers of the source and destination, which result in local write calls (44, 45) to the corresponding memory blocks (40a, 41a) in the source memory and the destination memory. In this instance, data has already been transferred to the destination memory block. This operation illustrates an advantage of the present invention over pre-copying, as if this block had been copied previously in a pre-copying system, this would represent a dirtying of the memory and require retransmission.

Figure 7:
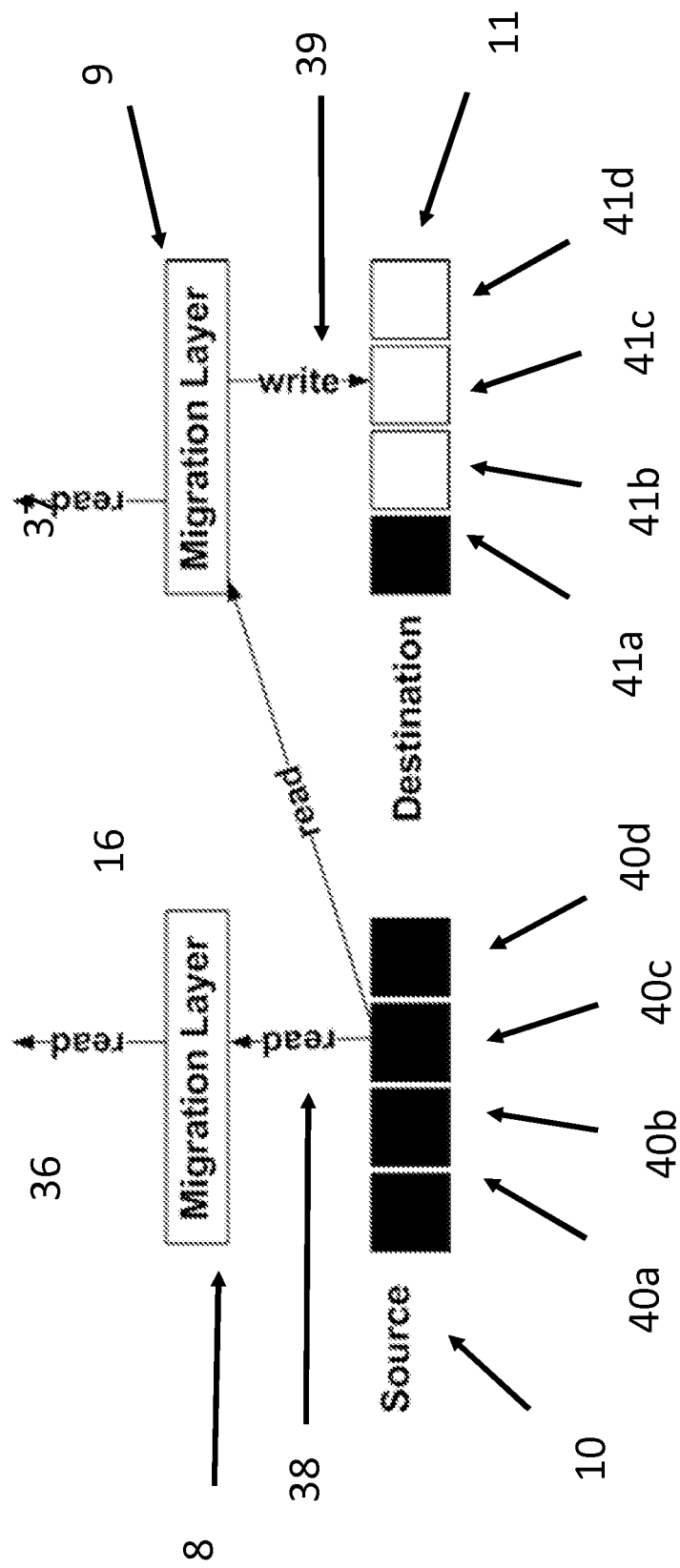
FIG. 7 is a schematic diagram of another step in the transfer of memory pages according to an embodiment.
Figure 8:
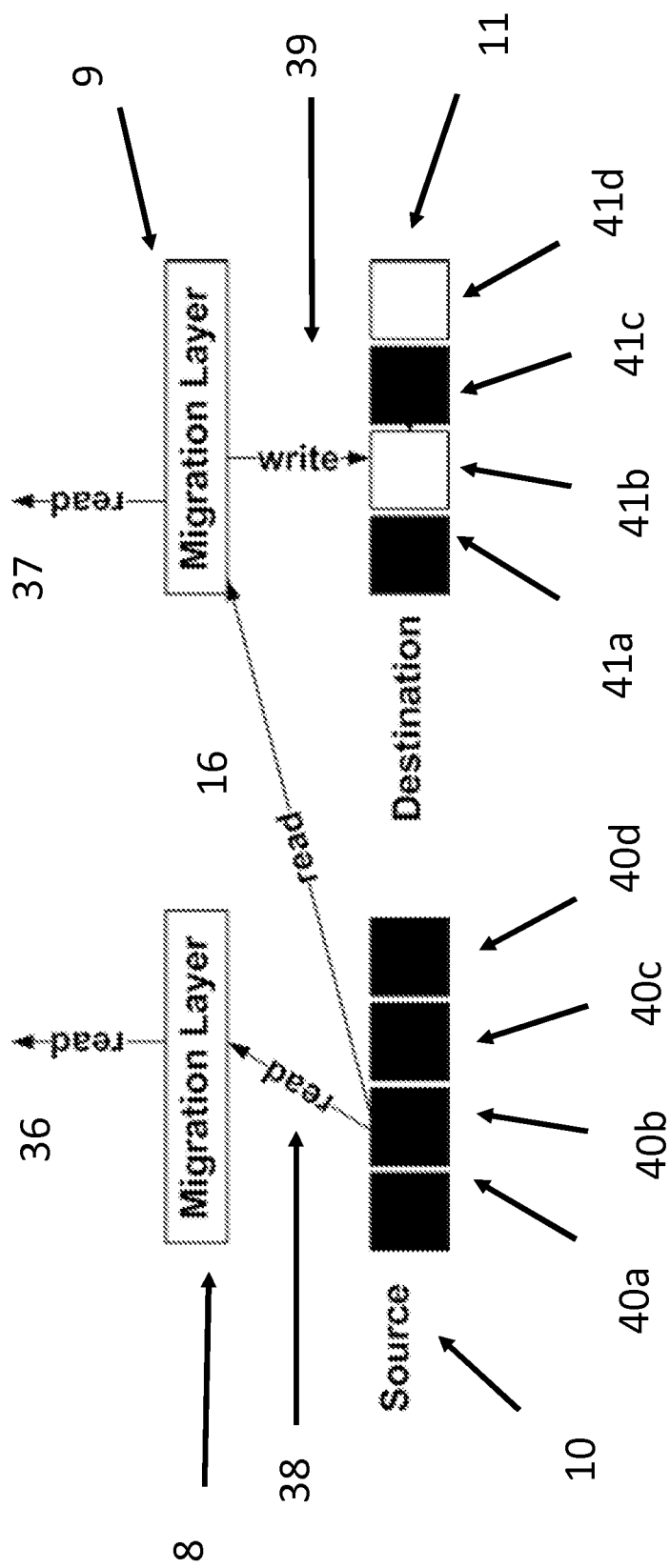
FIG. 8 is a schematic diagram of another step in the transfer of memory pages according to an embodiment.

FIG. 7 is a schematic diagram of a subsequent step in the live migration process. Here a read call is made to a memory block (40c, 41c) which has not yet been transferred. The source memory block (40c) is read by both the first and second instance and the second instance writes to the corresponding destination memory block (41c). In FIG. 8, the process continues, with another memory block (40b) read and the data written to the corresponding destination memory block (40b). The results of previous operations are illustrated, with data present (represented by black fill) in two of the destination memory blocks (41a, 41c).

Figure 9:
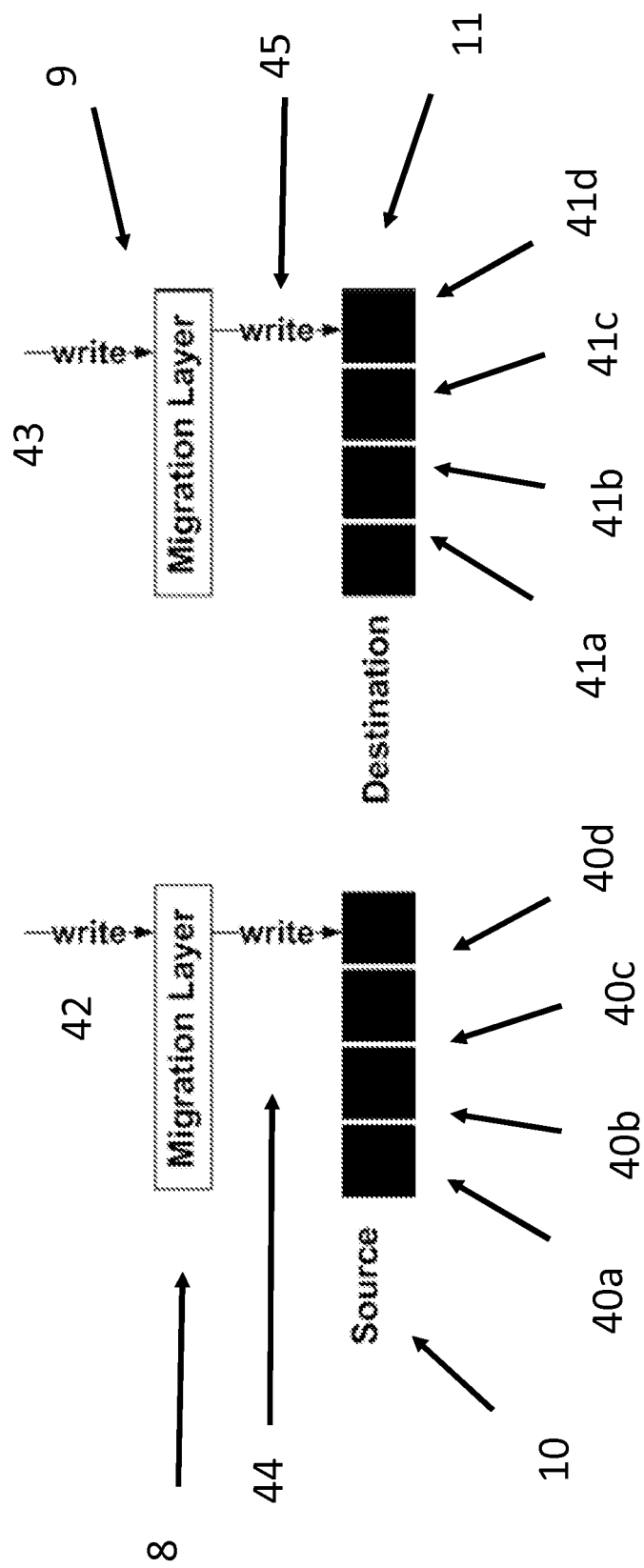
FIG. 9 is a schematic diagram of another step in the transfer of memory pages according to an embodiment.

FIG. 9 is a schematic diagram of a write operation in an empty memory block (41d). In this case, the second instance can perform the write operation independently of the value stored at the source. This is enabled by the parallel execution of the application instances, which means that the data written to the source (40d) and destination (41d) memory blocks will be the same. This mechanism has the advantage of reducing the network resources need for a write operation.

Figure 10:
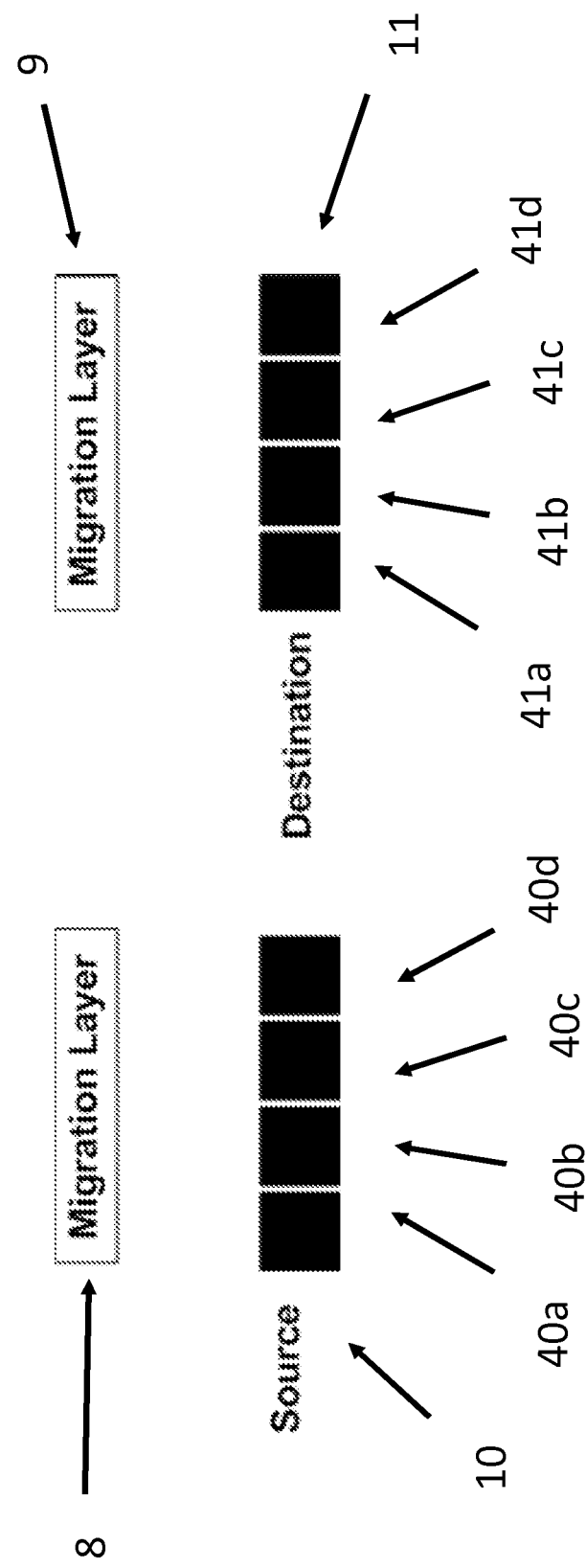
FIG. 10 is a schematic diagram another step in of the transfer of memory pages according to an embodiment.

FIG. 10 is a schematic diagram showing the final outcome of migration, with all of the memory blocks (41a, 41b, 41c, 41d) in the destination memory now containing the same data as the source memory blocks (40a, 40b, 40c, 40d). The migration process is complete and the first instance can now be shut down.

Figure 11:
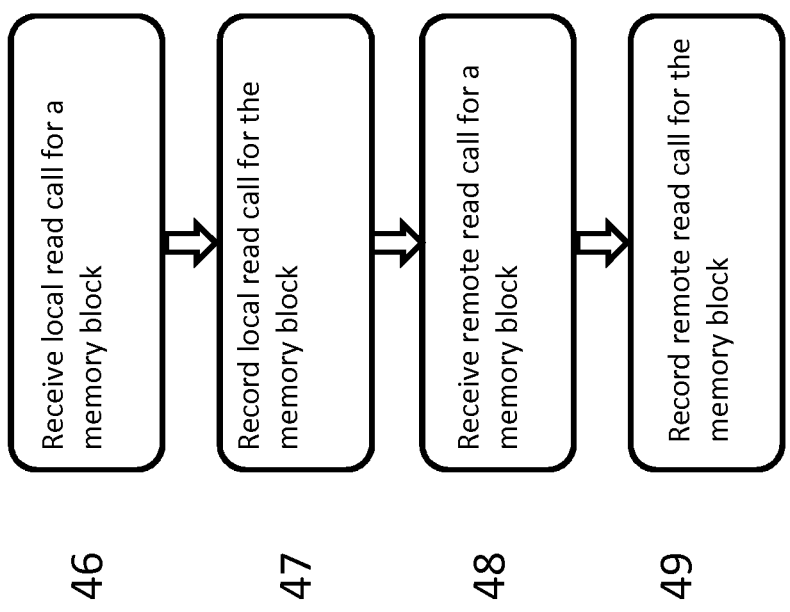
FIG. 11 is a flowchart showing the steps of recording local and remote read calls at the source host.
Figure 12:
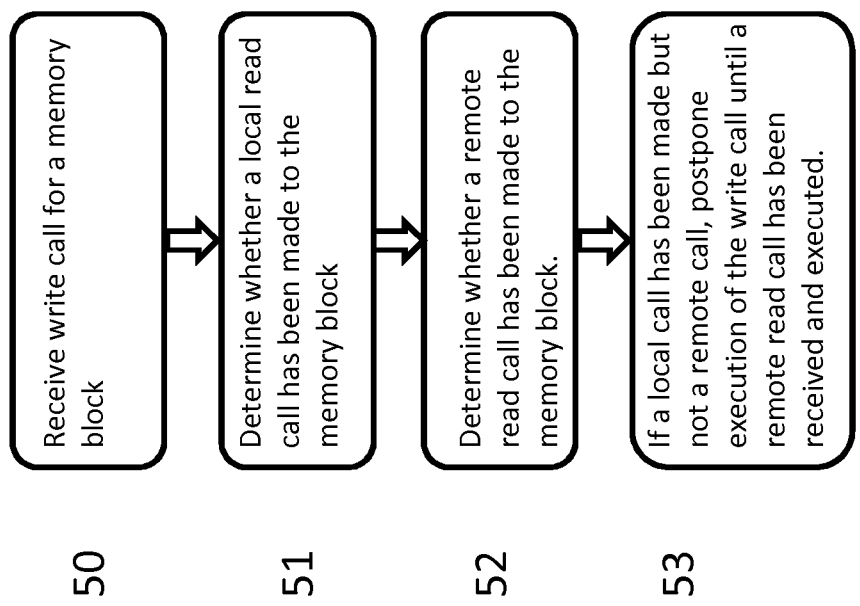
FIG. 12 is a flowchart showing the procedure on receipt of a write call at the source host according to an embodiment.

In an embodiment, the destination host and the source host may both require access to the source host's memory. A problem may arise if an input requires a read call followed by a write call which changes the data in the memory block. Although the instances are operating in parallel, processing and network delays must be allowed for. For example, if the first instance processes an input and makes both its read and write calls to a memory block before the arrival at the source memory of the corresponding remote read call from the second instance, then the data will have been changed in the block. The result will be that incorrect data will be passed to the destination host. In an embodiment, this problem is solved by the source migration layer checking if a remote read has been made before a write call is executed at a memory block. A prerequisite to this method is the recording of read calls to memory blocks. FIG. 11 is a flow chart for this process, which is typically performed by the migration layer. A local read call is received (46) and recorded (47). Usually, this is followed by receipt of a remote read call (48) for the memory block, which is also recorded (49). It is usual for the local call to be received first, due to network delays in receipt of the remote call. It is highly unlikely that the remote call would be received first, but since this would result in a safe remote reading before any write call, would not cause any problem to the operation of the instances. FIG. 12 is a flow chart which illustrates the procedure on receipt of a write call from the first instance. On receipt (50) of the write call, it is determined (51) whether a local read call has been received, and whether a remote read call has been received (52). If a local call has been received, but not a remote call, then the write call is postponed until the expected remote call arrives (53). In an embodiment, this is achieved by storing the data to be written to the memory block in a temporary memory.

Figure 13:
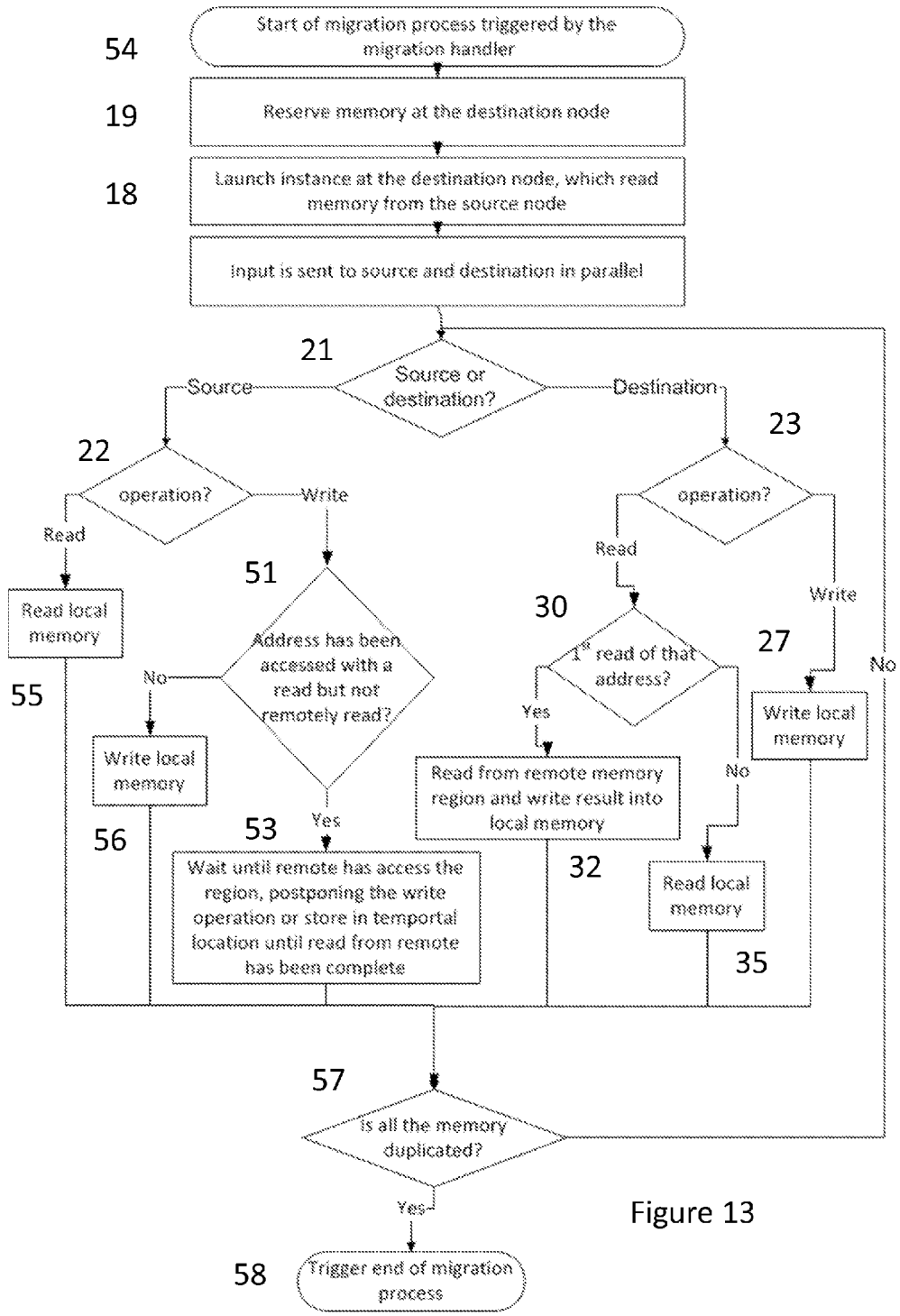
FIG. 13 is a flowchart of a live migration process according to an embodiment.

FIG. 13 is a flow chart showing a combination of the embodiments of FIGS. 2, 3 and 12. The process starts with the initialisation of the live migration (54). As in previous embodiments, memory is reserved at the destination host (19) and a second instance of the application is launched (18). Inputs to the application are sent in parallel (21) to both the first and second instances. At the source host, the input is processed (22) and if a read call is required, a local read is executed (55). If a write call is required, a check is made as to whether a read call has been made but not a remote read (51). If not, then the write call is executed (56). Otherwise, the write call is postponed until the remote read is completed (53). At the destination host, if a write call is required, it is executed locally (27). If a read call is required, it is determined (31) whether it is the first call to this memory block. If it is, a remote read call is executed (33) and the data is written to the corresponding local memory block. If the read call is not the first access of the memory block, then a local read call is executed (35). When the execution of all calls related to the input are complete, a check is made as to whether transfer of data associated with the application is complete (57). If it is, then the migration is finished and the first instance is shut down (58). Otherwise the migration process continues and the instances await the next input (21).

Figure 14:
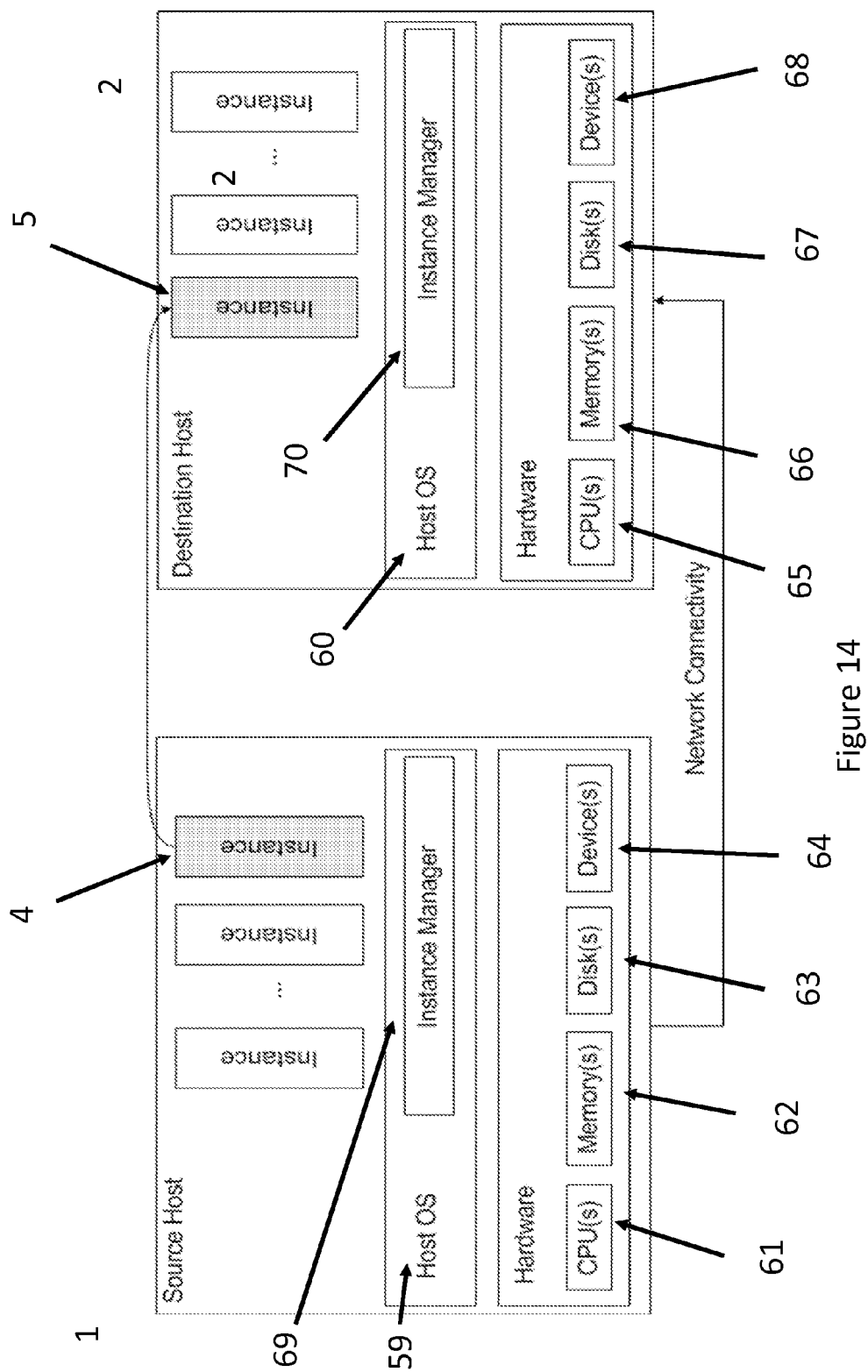
FIG. 14 is a schematic diagram of a typical hardware setup.

FIG. 14 is a typical hardware set-up for a live migration according to an embodiment. The set-up comprises two computing platforms, the source host (1) and the destination host (2). Each host comprises Central Processing units (CPUs) (61, 65), memories (62, 66), disks (63, 67) and other devices (64, 68). Each host has an operating system (59, 60), which has a scheduler that selects which processes to run and an instance manager (69, 70) which includes several device emulators and interfaces instances with the hardware. Finally, the instances (4, 5) are shown in the process of migration.

Figure 15:
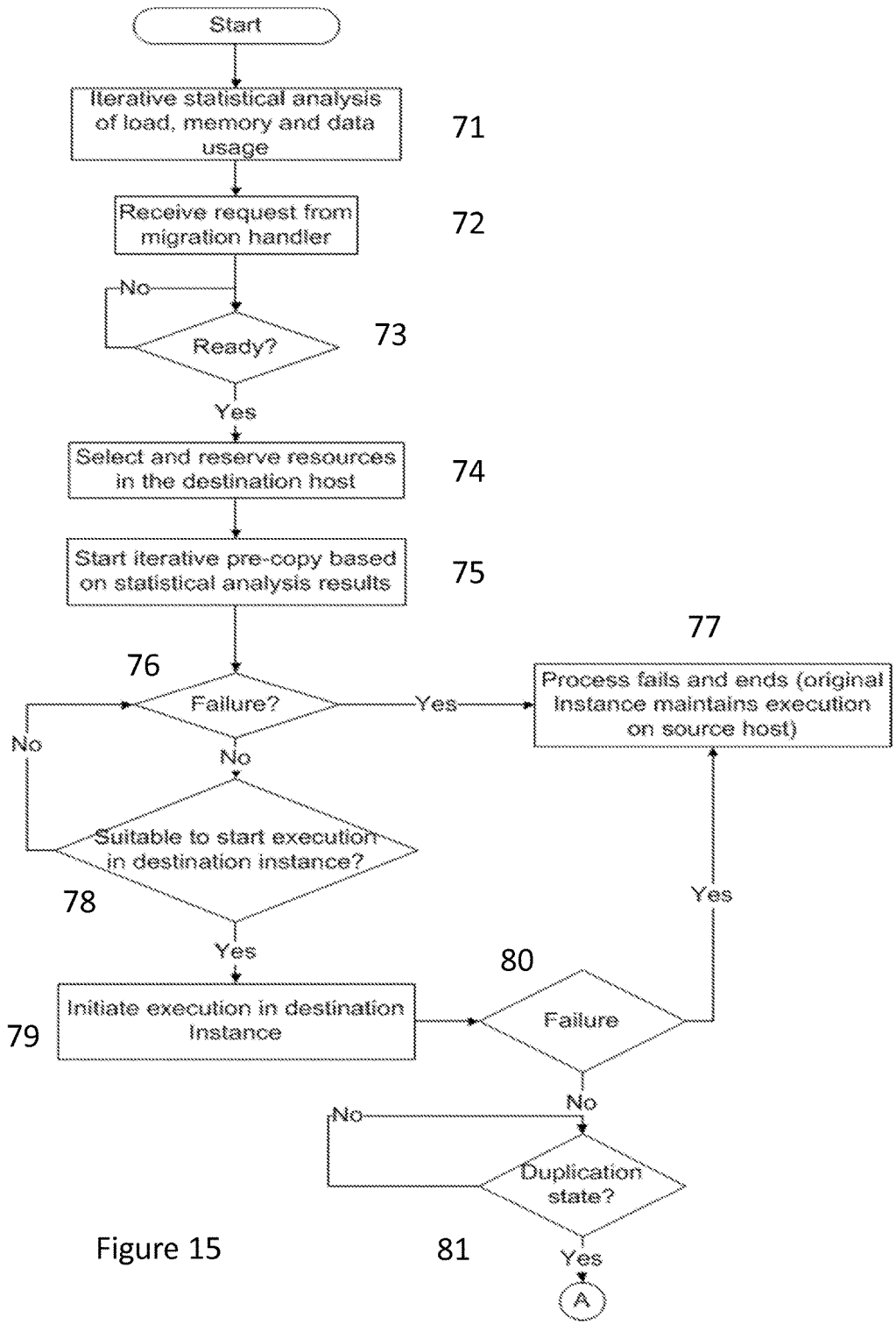
FIG. 15 is a flow chart of live migration according to an embodiment.
Figure 16:
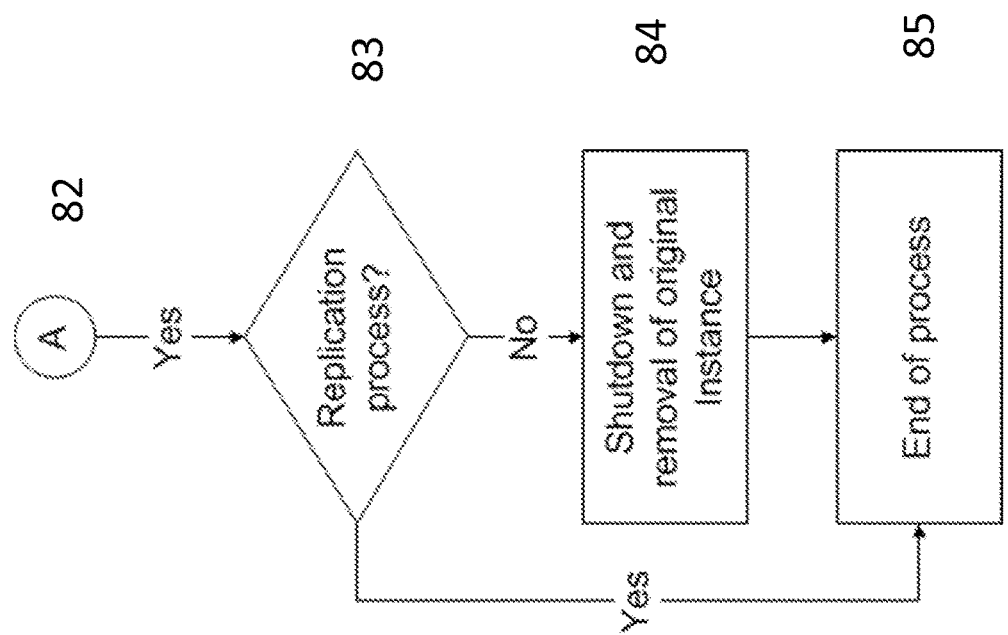
FIG. 16 is a continuation of the flowchart of FIG. 15.

The above process of migration relies on inputs to the application to initiate data transfer. In an embodiment, the mechanisms described above are supplemented by using pre-copy techniques to accelerate the memory transfer process. In an embodiment, the process comprises a statistical analysis in terms of load, memory and data usage. The process can start in an opportunistic manner, i.e. selecting a time when the activity level is low. FIG. 15 is a flow chart showing an overview of the migration process according to an embodiment. A statistical analysis is carried out (71), so that on receipt of a request (72) by the migration handler, a determination can be made as to whether the system is ready for the migration (73). A selection is then made as to the destination host followed by appropriate reservation of resources (74). Prior to the running of the operation of the parallel instance at the destination host, as described above, an iterative pre-copy of memory pages is performed, based on the selections made in the statistical analysis (75). A determination of the success of this step is made (76), and if it is determined that the pre-copy has failed, then the process ends and the instance maintains execution on the source host (77). If a success has been determined, then a start time is selected, optionally based on statistical analysis of load, memory usage and data usage (78) and the execution of the second instance at the destination host commences (79). If this stage fails (80), then the execution continues at the source host (77). If the stage is successful then the application enters a state where it is duplicated at source and destination (81). FIG. 16 is a flowchart of the termination of the migration. If a replication of the instance is required (83) then the process finishes (85). If the purpose of the migration was a transfer, then the original instance is shut down (84).

Figure 17:
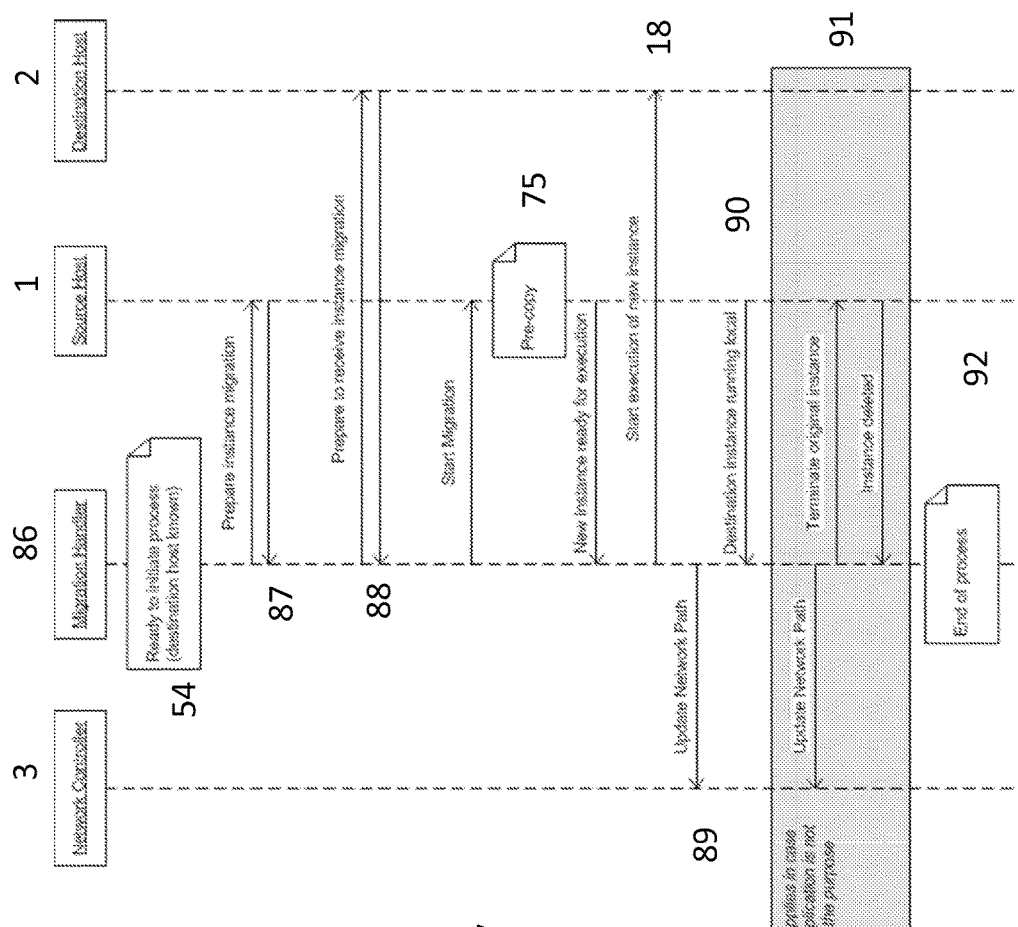
FIG. 17 is a signaling diagram of a live migration according to an embodiment.

FIG. 17 is a signalling diagram, showing the communication between the network controller (3), the migration handler (86), the source host (1) and the destination host (2). The signalling begins when the destination host is known and is ready to initiate the migration (54). The instance migration is prepared at the source host (87) and the destination host (88). This step comprises providing necessary information, such as permissions for remote memory access to the hosts. The next step starts the migration with the pre-copy (75). Once this step is complete, the start of execution of the new instance is signalled (18). The network path is updated with the network controller (89). Once the destination instance is running purely locally, the migration is complete, and this is signalled (90) to the migration handler by the destination host. Optionally, the original instance of the application is terminated (91). The process is then terminated (92).

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of live migration of an application from a source host to a destination host, wherein the application is associated with a plurality of memory pages, the source host comprises a first instance of the application and a source memory region, and each memory page has an associated source memory block in the source memory region, the method comprising:

at the destination host, reserving a destination memory region such that each memory page has an associated destination memory block in the destination memory region, and launching a second instance of the application at the destination host;

on receipt of an input to the application, processing the input in parallel at the first and second instances of the application at respective source and destination hosts;

at the source host, if the processing requires a read or a write call to a memory page, respectively reading from or writing to the associated source memory block; and at the destination host, if the processing requires a write call to a memory page, writing to the associated destination memory block and if the processing requires a read call to a memory page, sending the read call to the source host requesting that the source host read the memory page from the associated source memory block and provide the memory page to the destination host, and, on receipt of the memory page by the destination host, writing the memory page to the associated destination memory block.

2. The method as claimed in claim 1, further comprising:
at the destination host, on receipt of an input whose processing requires a read call to a memory page:
determining whether the read call is a first access of a memory page by the second instance of the application and either:
reading the associated destination memory block, if the read call is not the first access, or
reading the associated source memory block, if the read call is the first access; and
recording the memory access.

3. The method as claimed in claim 1, further comprising at the source host:
tracking read calls to source memory blocks; and
on receipt of an input the processing of which requires a write instruction to a source memory block:
determining whether a read call has been made for the block by the first instance;
determining whether a read call has been made for the block by the second instance; and
if a read call has been made by the first instance but not by the second instance:
postpone execution of the write call; and
on receipt of a read call from the second instance:
execute the read call from the second instance; and
execute the write call.

4. The method of claim 1, wherein a subset of the plurality of memory pages are copied from the source memory region to the destination memory region prior to the launching of the second instance.

5. The method according to claim 4, wherein the subset of memory pages is selected based on the results of a statistical analysis of one or more of the network load, memory usage and data usage.

6. The method according to claim 1, wherein a statistical analysis of one or more of the network load, memory usage and data usage is used to determine an opportunistic time.

7. The method as claimed in claim 6, wherein the opportunistic start time is determined by selecting a period of low activity.

8. The method according to claim 6, wherein the first instance is terminated upon completion of transfer of all memory pages to the destination memory region.

9. The method according to claim 6, wherein the migration is controlled by a migration layer located on one or both of the source and destination hosts.

10. A destination host comprising:
a central processing unit; and
a memory containing instructions that, when executed by the central processing unit, cause the destination host to perform the following steps in response to an instruction to commence live migration from a source host to the destination host, in parallel with the source host:
   launch an instance of an application, the application being associated with a plurality of memory pages in the source host corresponding to another instance of the application;
   reserve a destination memory region such that every memory page associated with the application has an associated memory block in the destination memory region; and
   in response to an input to the application:
   process the input; and
   if the processing requires a read call to a memory page:
      read from an associated source memory block at the source host; and
      write data acquired from the associated source memory block to the associated destination memory block;
   if the processing requires a write call to a memory page:
      write to the associated destination memory block.

11. The destination host as claimed in claim 10, wherein the instructions contained in the memory, when executed, further cause the destination host to:
   track read and write calls to the destination memory blocks: and
wherein processing the read call to a memory page further comprises:
   determine whether a read call is a first access of a memory page during the live migration; and either:
   read the associated destination memory block, if the read call is not the first access; or
read the associated source memory block, if the read call is the first access.

12. A source host comprising:
a central processing unit; and
a memory containing instructions that, when executed by the central processing unit, cause the source host to perform the following steps in response to an instruction to commence live migration from the source host to a destination host, in parallel with the destination host:
   host a first instance of an application;
   host memory pages associated with the application in a source memory region, each memory page being stored in a source memory block;
   track read calls to the source memory blocks;
   receive and execute read calls to the source memory region from a second instance of the application located at the destination host;
   in response to an input to the application, the processing of which requires a write call to a source memory block:
      determine whether a read call has been made for the source memory block by the first instance;
      determine whether a read call has been made for the source memory block by the second instance; and
      if the source memory block has been read by the first instance but not by the second instance:
         postpone execution of the write call; and
      on receipt of a read call from the second instance:
         execute the read call from the second instance: and
         execute the write call.

13. A non-transitory computer readable medium having stored thereon computer program instructions for implementing live migration of an application from a source host to a destination host, wherein the application is associated with a plurality of memory pages, the source host comprises a first instance of the application and a source memory region, and each memory page has an associated source memory block in the source memory region, wherein the instructions, when executed on at least one processor, cause the at least one processor to carry out a method comprising:
   at a destination host, reserving a destination memory region such that each memory page has an associated destination memory block in the destination memory region, and launching a second instance of the application at the destination host;
   on receipt of an input to the application, processing the input in parallel at the first and second instances of the application at respective source and destination hosts;
   at the source host, if the processing requires a read or a write call to a memory page, respectively reading from or writing to the associated source memory block; and
   at the destination host, if the processing requires a write call to a memory page, writing to the associated destination memory block and if the processing requires a read call to a memory page, sending the read call to the source host requesting that the source host read the memory page from the associated source memory block and provide the memory page to the destination host, and, on receipt of the memory page by the destination host, writing the memory page to the associated destination memory block.

* * * * *